US008289738B2

(12) United States Patent
Shimizu (10) Patent No.: US 8,289,738 B2
(45) Date of Patent: Oct. 16, 2012

(54) SWITCHING POWER SUPPLY (75) Inventor: Hideo Shimizu, Higashimurayama (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 349 days.

(21) Appl. No.: 12/659,316

(22) Filed: Mar. 4, 2010

(65) Prior Publication Data
US 2010/0246227 A1 Sep. 30, 2010

(30) Foreign Application Priority Data
Mar. 27, 2009 (JP) ................... 2009-079025

(51) Int. Cl.
H02M 7/217 (2006.01)
(52) U.S. Cl. .................. 363/45; 323/207; 323/222
(58) Field of Classification Search .............. 363/89, 363/44, 45–48, 79; 323/207, 222
See application file for complete search history.

(56) References Cited

U.S. PATENT DOCUMENTS

| 5,146,398 A | * | 9/1992 | Vila-Masot et al. | 363/89 |
| 5,638,265 A | * | 6/1997 | Gabor | 363/89 |
| 7,183,753 B2 | * | 2/2007 | Tsuruya | 323/222 |
| 2008/0130336 A1 | * | 6/2008 | Taguchi | 363/125 |
| 2008/0246444 A1 | * | 10/2008 | Shao et al. | 323/207 |

FOREIGN PATENT DOCUMENTS

| JP | 2004-282958 A | 10/2004 |
| JP | 2005-295637 A | 10/2005 |

* cited by examiner

Primary Examiner — Harry Behm
(74) Attorney, Agent, or Firm — Manabu Kanesaka (57) ABSTRACT

A switching power supply has a full-wave AC rectifier circuit; a chopper circuit including an inductor, a capacitor smoothing current from the inductor, and a switching device for on-off control of the current fed to the capacitor. The rectifier circuit further has an input voltage detector circuit detecting chopper circuit input voltage; an output voltage error detector circuit detecting an error between an output voltage from the chopper circuit and a set voltage; a current control signal generator circuit generating a current control signal in-phase with an input voltage detection signal having a waveform similar to the input voltage detection signal and an amplitude proportional to an output voltage error signal; a current detector circuit detecting inductor current flow; a frequency setting circuit; an oscillator circuit; and a switching control circuit switching the switching device based on oscillation circuit signal, the current control signal, and the current detection signal.

4 Claims, 5 Drawing Sheets

SWITCHING POWER SUPPLY

BACKGROUND OF THE INVENTION AND RELATED ART STATEMENT

The present invention relates to a switching power supply that derives a stable DC power supply from an AC input power supply. Specifically, the invention relates to a switching power supply that sets the input voltage and input current fed to a chopper circuit to be essentially in-phase with and similar to each other for improving the power factor.

Figure 5:
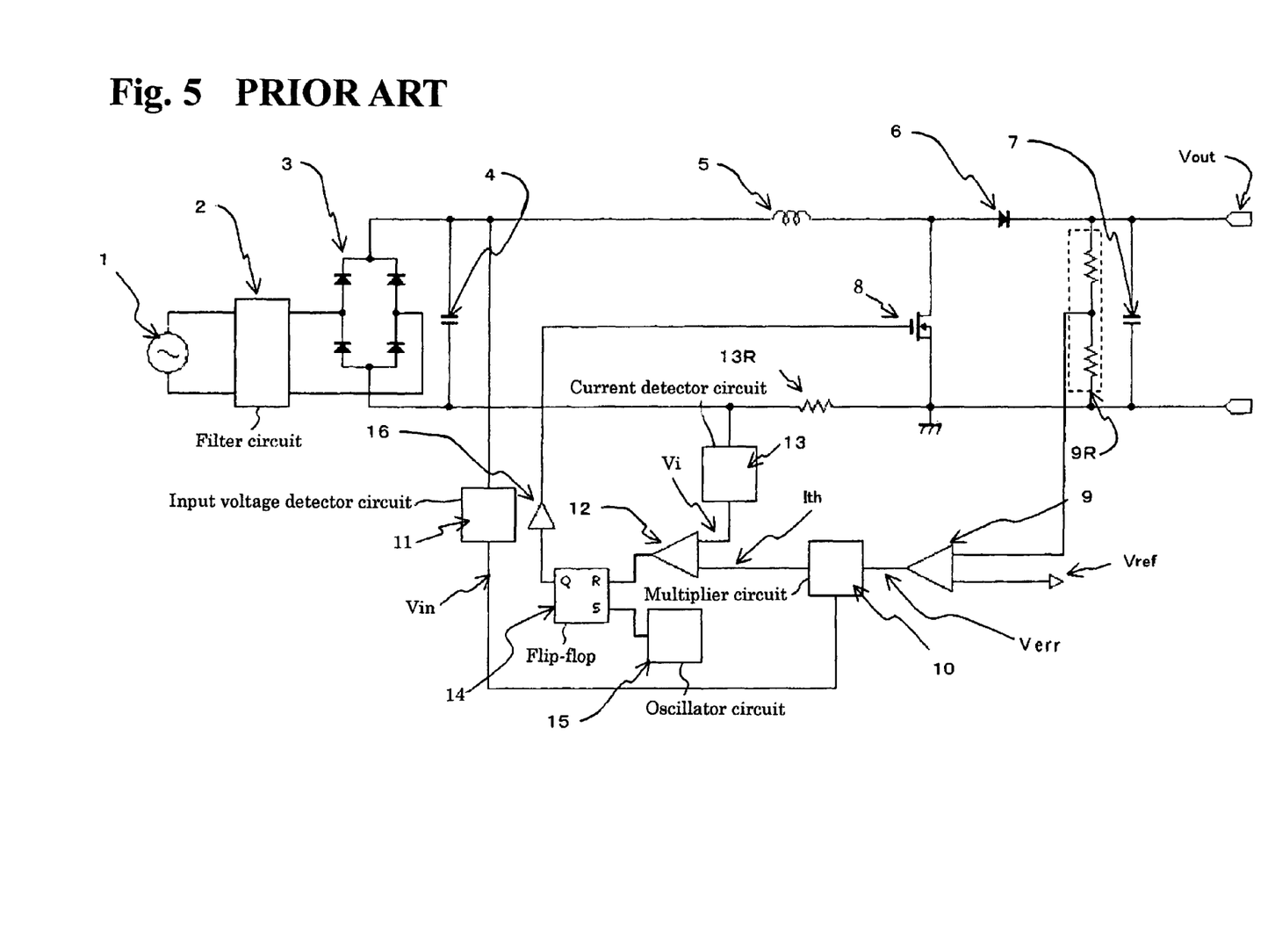
FIG. 5 is a block circuit diagram of a conventional switching power supply.

FIG. 5 is a block circuit diagram of a conventional switching power supply.

Referring now to FIG. 5, the output from AC power supply 1 is fed via filter circuit 2 to rectifier circuit 3 formed of a diode bridge. Rectifier circuit 3 conducts full-wave rectification of the output from AC power supply 1. Capacitor 4 removes high frequency noise from the output from rectifier circuit 3. A current is fed to smoothing capacitor 7 via inductor 5 and diode 6. As the current is fed to smoothing capacitor 7, smoothed DC voltage Vout is outputted. Switching device 8 such as a MOSFET is connected between inductor 5 and diode 6. Switching device 8 controls the on-off of the current that flows from inductor 5 to diode 6.

Output voltage error detector circuit 9 amplifies the error between the signal obtained by dividing output voltage Vout with voltage-dividing resistor 9R and set voltage Vref. Output voltage error detector circuit 9 feeds the error amplified therein to multiplier circuit 10 as output voltage error signal Verr. Input voltage detector circuit 11 detects the input voltage to a chopper circuit formed of capacitor 4, inductor 5, diode 6, and smoothing capacitor 7. In other words, input voltage detector circuit 11 detects the output voltage from rectifier circuit 3 and outputs input voltage signal Vin. Input voltage detector circuit 11 is formed of a voltage-dividing circuit using resistors or a level-shift circuit. Input voltage signal Vin is in-phase with and similar in the waveform thereof to the output voltage from rectifier circuit 3, that is the absolute value of the AC input voltage from AC power supply 1. (If described strictly, the waveform of input voltage signal Vin, from which a DC bias component is subtracted, is similar to the waveform of the output voltage from rectifier circuit 3 in some cases, in which a level-shift circuit is employed for input voltage detector circuit 11.) Multiplier circuit 10 multiplies output voltage error signal Verr and input voltage signal Vin generated in input voltage detector circuit 11. As a result, multiplier circuit 10 generates current control signal Ith in phase with and similar to input voltage signal Vin and having an amplitude proportional to output voltage error signal Verr.

The current that flows through inductor 5 is converted to current detection signal Vi with detecting resistor 13R and current detector circuit 13. Current detection signal Vi is compared with current control signal Ith in comparator circuit 12. The output from comparator circuit 12 is fed to the reset input (R) of flip-flop 14. Flip-flop 14, reset by the output from comparator circuit 12, outputs a signal at a low level from the output terminal (Q) thereof. Oscillator circuit 15 is connected to the set input (S) of flip-flop 14. Oscillator circuit 15 sets flip-flop 14 at a certain switching frequency and changes the output from flip-flop 14 to a signal at a high level. The output from flip-flop 14 is fed to driver circuit 16. Driver circuit 16 turns switching device 8 on, when the input to driver circuit 16 is at the high level. Driver circuit 16 turns switching device 8 off, when the input to driver circuit 16 is at the low level.

As switching device 8 is turned on, the current from inductor 5 increases and current detection signal Vi rises. As current detection signal Vi exceeds current control signal Ith, the output from comparator circuit 12 is set at a high level and the high-level signal is fed to the reset input of flip-flop 14. As a result, the output from flip-flop 14 is set at the low level. The low-level output from flip-flop 14 turns switching device 8 off via driver circuit 16. As switching device 8 is turned off, the current from inductor 5 decreases gradually. However, since flip-flop 14 is set at a certain frequency by oscillator circuit 15, the output from flip-flop 14 changes to a high-level at a time point, at which the current from inductor 5 decreases to some extent, and switching device 8 is turned on via driver circuit 16. Thus, a current in-phase with and similar to input voltage signal Vin flows through inductor 5, resulting in an improved (corrected) power factor.

For reducing the inductor size in the power supply circuit as described above, it is necessary to raise the switching frequency. As the switching frequency becomes higher, the switching loss increases, impairing the conversion efficiency. It is possible to improve the conversion efficiency by lowering the switching frequency. However, for removing the conduction noise caused, it is necessary to set the cutoff frequency of the filter circuit low, requiring an enlarged filter circuit.

As an example of the countermeasures against the problem described above, the following Patent Document 1 discloses a power factor correction circuit that improves the conversion efficiency by controlling the switching frequency in response to the AC power supply voltage and by reducing the switching frequency in the region, in which the AC power supply voltage is low.

[Patent Document 1] Japanese Unexamined Patent Application Publication No. 2004-282958

However, in the power factor correction circuit disclosed in the Patent Document 1, the switching frequency shows the maximum in the high-AC power-supply-voltage region, in which a large coil current is caused. Therefore, the power factor correction circuit disclosed in the Patent Document 1 is not always very efficient to reduce the switching loss.

In view of the foregoing, it is desirable to obviate the problems described above. It is also desirable to provide a switching power supply circuit that facilitates reducing the switching loss and the conduction noise caused.

Further objects and advantages of the invention will be apparent from the following description of the invention.

SUMMARY OF THE INVENTION

According to the subject matter of a first aspect of the present invention, there is provided a switching power supply including:

a rectifier circuit conducting full-wave rectification of an AC power supply for obtaining a pulsating output;

a chopper circuit including an inductor having a first end connected to the rectifier circuit, a capacitor smoothing the current fed from the inductor for obtaining a DC output, and a switching device connected to the second end of the inductor, the switching device conducting the on-off control of the current fed to the capacitor;

an input voltage detector circuit detecting an input voltage fed to the chopper circuit, the input voltage detector circuit outputting an input voltage detection signal;

an output voltage error detector circuit detecting the error between an output voltage from the chopper circuit and a set voltage, the output voltage error detector circuit outputting an output voltage error signal;

a current control signal generator circuit generating a current control signal in-phase with the input voltage detection signal, the current control signal having a waveform similar to the waveform of the input voltage detection signal, the current control signal having an amplitude proportional to the output voltage error signal;

a current detector circuit detecting the current flowing through the inductor, the current detector circuit outputting a current detection signal;

a frequency setting circuit generating a switching frequency signal;

an oscillator circuit generating an oscillation signal at a frequency based on the switching frequency signal; and a switching control circuit turning on and off the switching device based on the oscillation signal, the current control signal, and the current detection signal.

The frequency setting circuit changes the frequency of the oscillator circuit in response to either one or both of the changes of the input voltage detection signal and the current control signal.

According to a second aspect of the present invention, the frequency setting circuit makes the frequency change such that the frequency increases in response to the input voltage around the zero-cross of the AC power supply voltage. The frequency setting circuit makes the frequency change such that the frequency decreases in response to the current control signal around the peak AC power supply voltage. The frequency setting circuit sets the frequency at a predetermined value in the region between the zero-cross region and the peak region of the AC power supply voltage.

According to the invention, the switching frequency is made to change, employing either one or both of the AC input voltage and the current control signal, such that the switching frequency becomes higher as the input voltage detection signal is larger in the region in which the absolute value of the AC power supply voltage is small. The switching frequency is made to change, employing either one or both of the AC input voltage and the current control signal, such that the switching frequency becomes lower as the current control signal is larger in the region, in which the absolute value of the AC power supply voltage is small. In the region, in which the absolute value of the AC power supply voltage is intermediate, the switching frequency is controlled at a predetermined value.

By executing the switching frequency control in the manner described above, the switching loss is reduced, the conversion efficiency is improved, and the conduction noises are reduced by dispersing the switching frequency.

DETAILED DESCRIPTION OF PREFERRED EMBODIMENTS

Now the invention will be described in detail hereinafter with reference to the accompanied drawings which illustrate the preferred embodiments of the invention.

Figure 1:
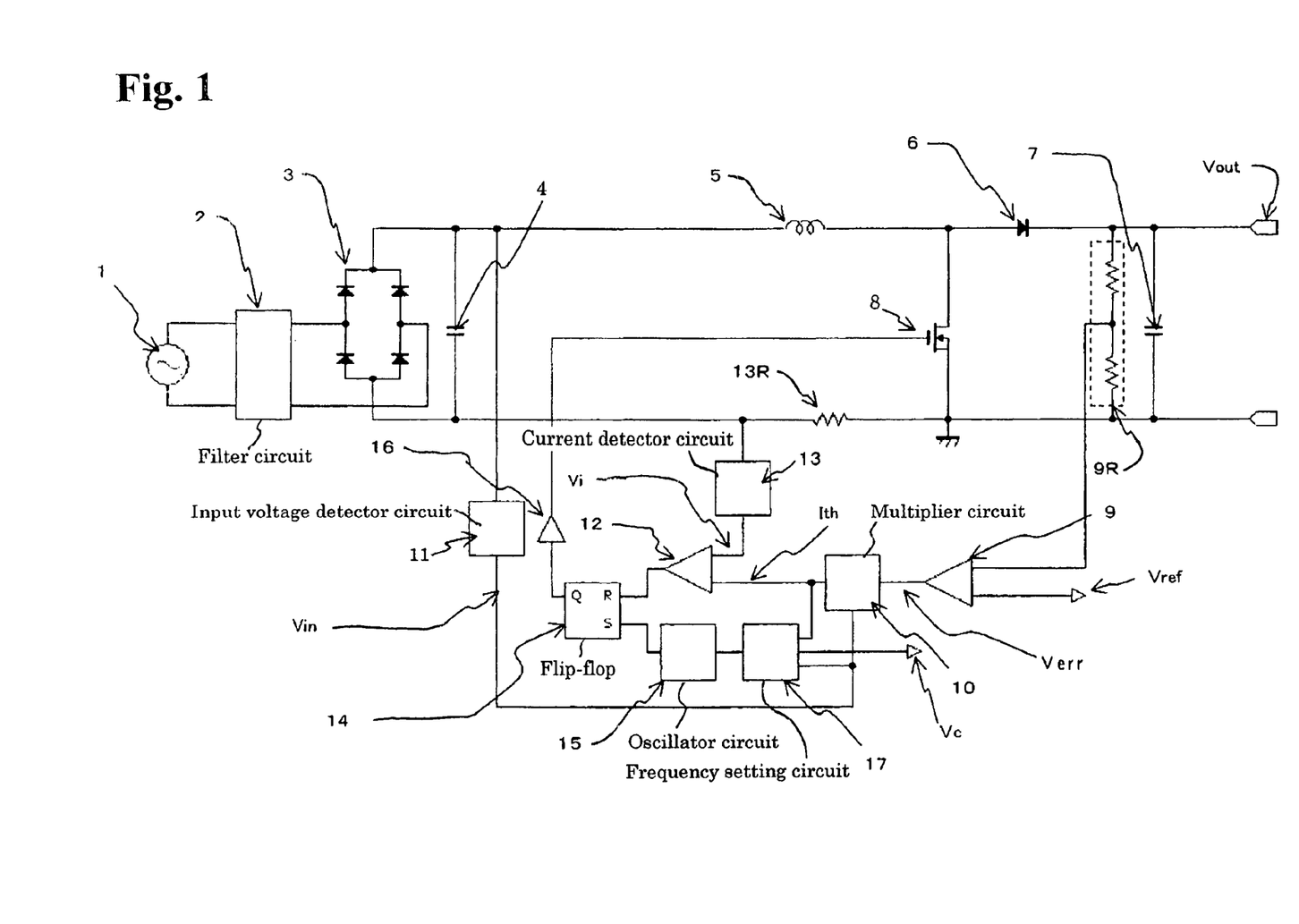
FIG. 1 is a block circuit diagram of a switching power supply according to an embodiment of the invention.

FIG. 1 is a block circuit diagram of a switching power supply according to an embodiment of the invention. In FIG. 1, the same reference numerals and symbols as used in FIG. 5 are used to designate the same constituent elements and their duplicated descriptions are omitted for the sake of brevity.

The switching power supply shown in FIG. 1 is different from the conventional switching power supply in that oscillator circuit 15 is connected to frequency setting circuit 17 and frequency setting circuit 17 is connected to input voltage detector circuit 11 and multiplier circuit 10 such that input voltage signal Vin, current control signal Ith and constant voltage signal Vc are fed to frequency setting circuit 17.

Figure 2:
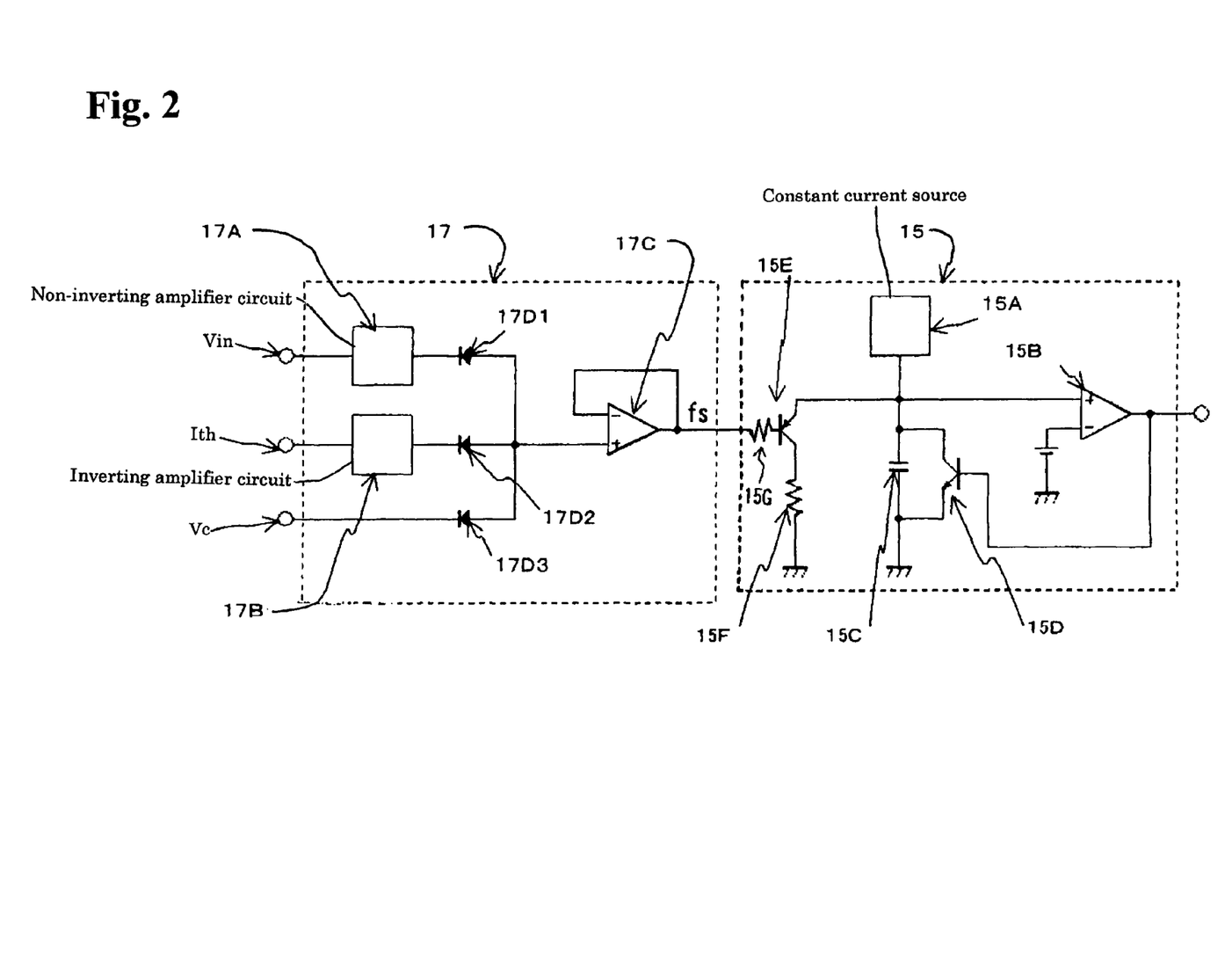
FIG. 2 is a block circuit diagram showing the detailed structures of the oscillator circuit and the frequency setting circuit shown in FIG. 1.
Figure 3:
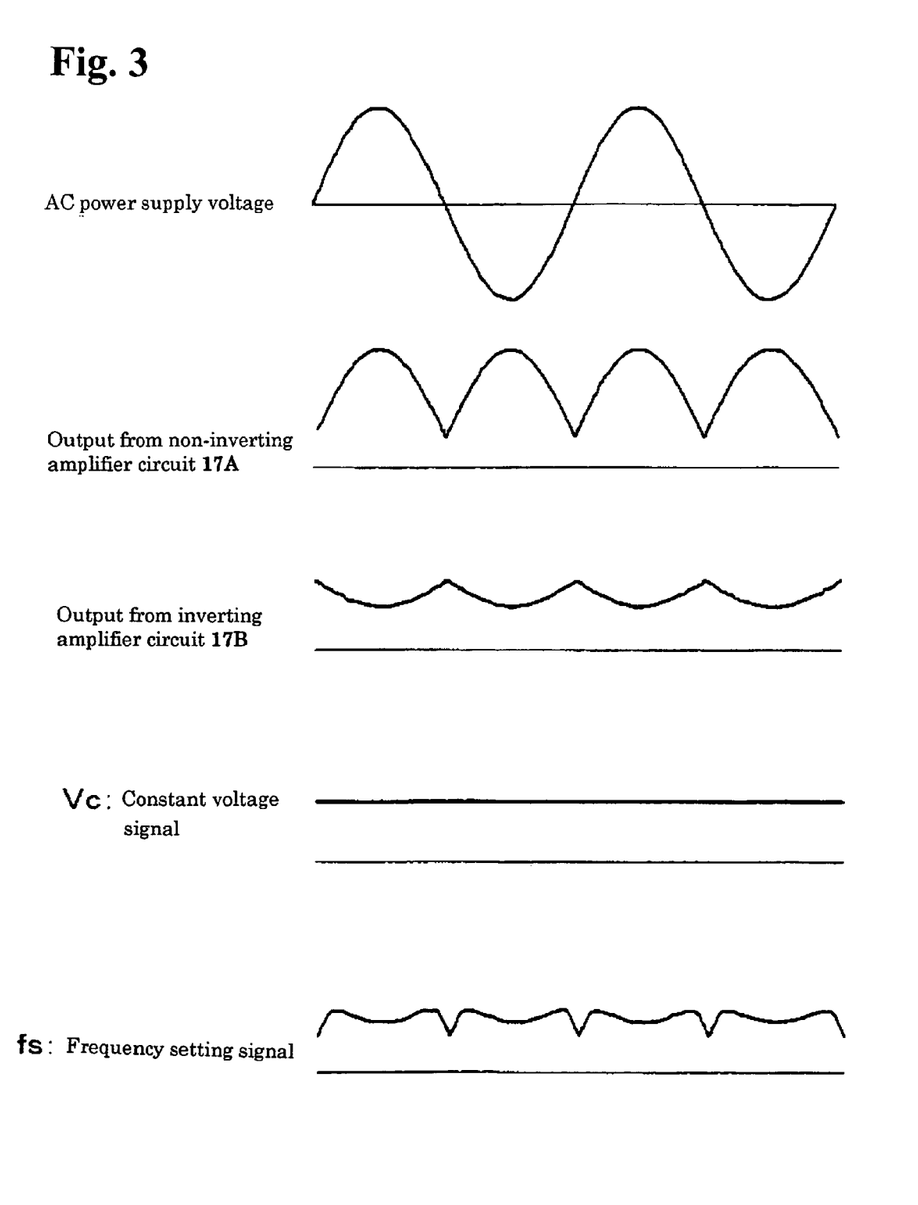
FIG. 3 is a wave chart describing the examples of signal waveforms in some portions of the frequency setting circuit.

Now the structures and functions of oscillator circuit 15 and frequency setting circuit 17 will be described below with reference to FIGS. 2 and 3. FIG. 2 is a block circuit diagram showing the detailed structures of oscillator circuit 15 and frequency setting circuit 17. FIG. 3 is a wave chart describing the examples of signal waveforms in some portions of frequency setting circuit 17.

Oscillator circuit 15 is formed of constant current source 15A, comparator 15B, capacitor 15C, transistors 15D, 15E, and resistors 15F, 15G. Capacitor 15C is charged by the current that flows from constant current source 15A. As the voltage across capacitor 15C exceeds a certain value, the output from comparator 15B is set at a high level, transistor 15D is turned ON, and capacitor 15C is discharged. As capacitor 15C is discharged, the output from comparator 15B is set at a low level, transistor 15D is turned OFF, and constant current source 15A charges capacitor 15C. By repeating the operations described above, a triangular wave (saw-tooth wave) having a given period is generated.

The output from comparator 15B is connected to the set input of flip-flop 14 in FIG. 1. As the output from comparator 15B is set at a high level, flip-flop 14 is set and switching device 8 is turned on via driver circuit 16. The base of transistor 15E is connected to frequency setting circuit 17 via base resistor 15G. The collector of transistor 15E is grounded via resistor 15F and the emitter thereof is connected to constant current source 15A. As described later, the collector current of transistor 15E changes in response to frequency setting signal fs from frequency setting circuit 17. In other words, the current component, induced to flow to transistor 15E but not used for charging capacitor 15C, among all the current components flowing from constant current source 15A changes in response to frequency setting signal fs. Therefore, the period of the triangular wave and the switching frequency change. In short, oscillator circuit 15 works to change the switching frequency in response to frequency setting signal fs.

As shown in FIG. 2, frequency setting circuit 17 is formed of non-inverting amplifier circuit 17A, inverting amplifier circuit 17B, buffer circuit 17C, and diodes 17D1 through 17D3. Input voltage signal Vin fed to frequency setting circuit 17 is not inverted but amplified by non-inverting amplifier circuit 17A. Current control signal Ith fed to frequency setting circuit 17 is inverted and amplified by inverting amplifier circuit 17B. The output from non-inverting amplifier circuit 17A, the output from inverting amplifier circuit 17B and constant voltage signal Vc are fed to buffer circuit 17C via diodes 17D1, 17D2 and 17D3, respectively. As described in FIG. 3, buffer circuit 17C outputs the smallest one among the output from non-inverting amplifier circuit 17A, the output from inverting amplifier circuit 17B and constant voltage signal Vc as frequency setting signal fs. Frequency setting signal fs makes the oscillation frequency of oscillator circuit 15 (the period of the triangular wave) change as described below.

In oscillator circuit 15, current does not flow through transistor 15E as long as the voltage of capacitor 15C (the emitter voltage of transistor 15E) is equal to or lower than the base voltage of transistor 15E. Therefore, while the voltage of capacitor 15C is low, the voltage of capacitor 15C rises with a constant gradient independent of the output from frequency setting circuit 17 but determined only by the current of constant current source 15A. As the voltage of capacitor 15C exceeds the base voltage of transistor 15E to the =higher side, the gradient thereof changes.

In other words, when the voltage difference between the voltage of capacitor 15C and the forward voltage drop (about 0.7 V) of a transistor formed of the emitter and base of transistor 15E, becomes higher than the base voltage of transistor 15E, a current described by the following formula (1) flows to the base of transistor 15E.

(Emitter voltage−0.7V−Base voltage)/(Resistance value of base resistor 15G)     (1)

The emitter current of transistor 15E is $h_{fe}$ (the DC current amplification factor) times as large as the base current thereof. The emitter current value of transistor 15E is as large as several % of the current from constant current source 15A. As emitter current starts flowing, the current that charges capacitor 150 is reduced by the emitter current. Therefore, the gradient, at which the voltage across capacitor 15C rises, becomes small.

In the region around the peak AC power supply voltage, the output from inverting amplifier circuit 17B is the smallest signal among the inputs to buffer circuit 17C. In the region described above, as the absolute value of the AC power supply voltage is higher, the output voltage from inverting amplifier circuit 17B, that is the input voltage to oscillator circuit 15, becomes lower as described in FIG. 3. Since the gradient, at which the voltage of capacitor 15C rises, becomes smaller in the earlier stage as frequency setting signal fs fed to oscillator circuit 15 is smaller, the oscillation period of oscillator circuit 15 is elongated. Since the emitter current becomes larger at the same emitter voltage as the base voltage is lower as the above-described formula (1) indicates, the gradient, at which the voltage of capacitor 15C rises, becomes smaller. Therefore, as frequency setting signal fs is smaller, the frequency of oscillator circuit 15 becomes lower.

Figure 4:
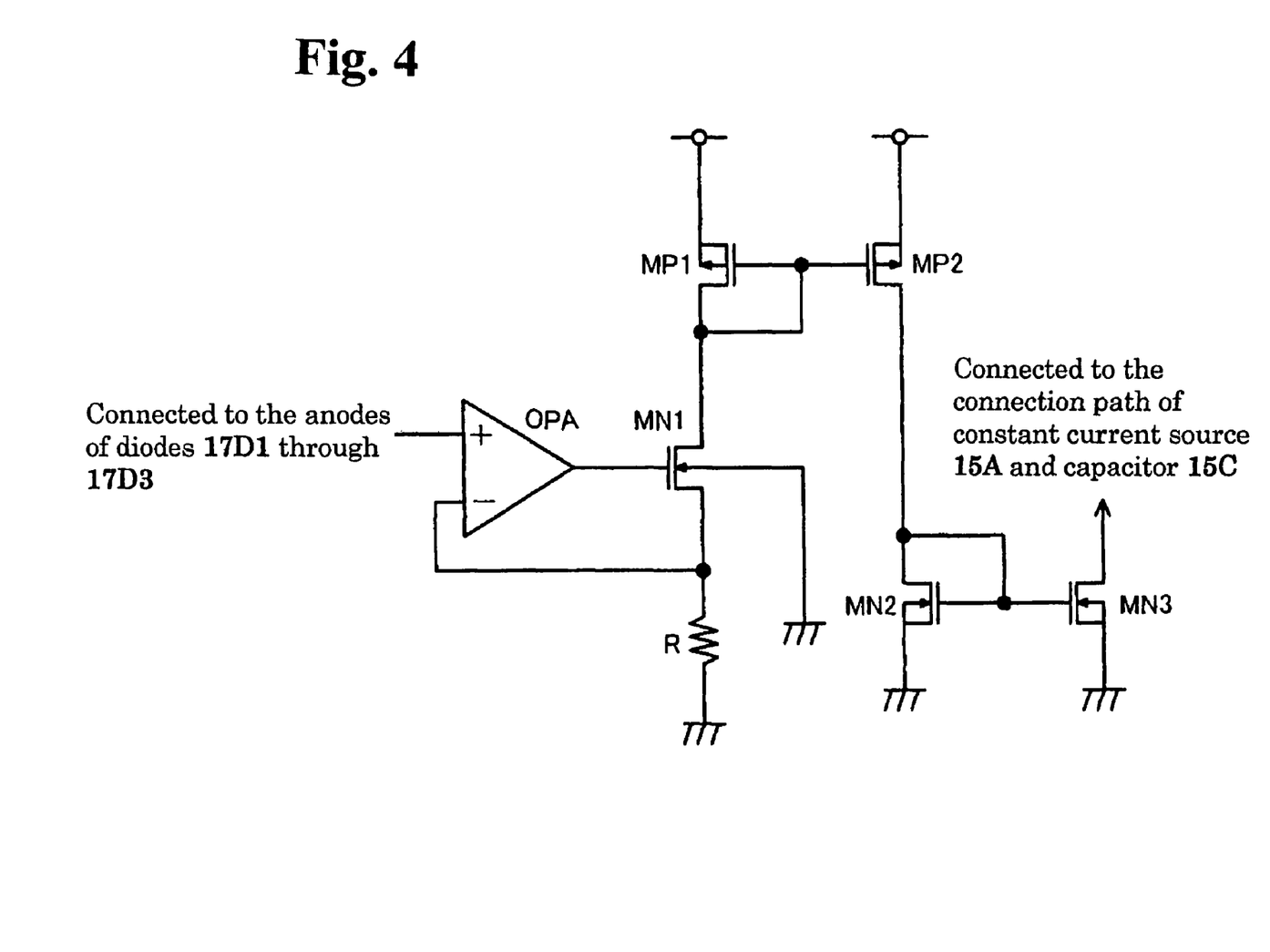
FIG. 4 is a circuit diagram showing another example of the oscillator circuit in FIG. 1.

FIG. 4 is a circuit diagram showing another example of the oscillator circuit.

In FIG. 2, the relation between frequency setting signal fs fed to oscillator circuit 15 and the emitter current of transistor 15E, that is the current value, at which the current from constant current source 15A is made to bypass, is nonlinear. The circuit configuration shown in FIG. 4 sets the relation between frequency setting signal fs and the emitter current of transistor 15E to be linear. The series circuit, shown in FIG. 2, that includes buffer circuit 17C, base resistor 15G and transistor 15E is replaced by the circuit illustrated in FIG. 4.

Since two inputs of operational amplifier OPA shown in FIG. 4 are in the state of virtual short, a current proportional to the voltage fed to the non-inverting input terminal (+) of operational amplifier OPA flows through resistor R. P-channel MOS transistors MP1 and MP2 constitute a first current mirror circuit. N-channel MOS transistors MN2 and MN3 constitutes a second current mirror circuit. Due to the circuit configuration described above, a current proportional to the current that flows through resistor R, flows to the drain of N-channel MOS transistor MN3.

In other words, among the current components of constant current source 15A that charge capacitor 15C, the current component proportional to the input voltage to oscillator circuit 15 is made to bypass to N-channel MOS transistor MN3. By the current component made to bypass to N-channel MOS transistor MN3, the gradient, at which the voltage of capacitor 15C rises, is made to be smaller. In the circuit shown in FIG. 2, the gradient, at which the voltage of capacitor 15C rises, changes during the voltage rise. In the circuit shown in FIG. 4, the gradient is constant as far as the input to operational amplifier OPA is constant.

By reducing the switching frequency in the region in which the absolute value of the AC input voltage is large, that is in the region in which the coil current becomes large, the switching loss is reduced and the conversion efficiency is improved. Since the switching frequency is dispersed, it is possible to reduce the conduction noises and to reduce the filter circuit size.

By employing the current control signal as a signal for reducing the switching frequency in the region, in which the absolute value of the AC input voltage is large, the switching frequency is lowered more as the load becomes heavier in the region in which the absolute value of the AC input voltage is large, and it becomes possible to prevent the conversion efficiency from lowering.

Although the invention has been described so far in connection with an example that changes the switching frequency in response to the input voltage signal and the current control signal, it is also possible to employ only the current control signal and to configure the switching power supply according to the invention such that the current control signal is fed also to non-inverting amplifier circuit 17A.

In the above described configuration, it is possible to improve the conversion efficiency by setting the amplification factor of non-inverting amplifier circuit 17A such that the output from non-inverting amplifier circuit 17A is less than the constant voltage signal Vc under a light-load for preventing the switching frequency from rising.

It is also possible to configure the switching power supply according to the invention by employing only the input voltage signal in substitution for the input voltage signal and current control signal and by feeding the input voltage signal also to inverting amplifier circuit 17B. Since a constant frequency change is caused in this configuration independently of the load, the frequency distribution of the conduction noise becomes constant and the design of the filter circuit is facilitated.

The disclosure of Japanese Patent Application No. 2009-079025 filed on Mar. 27, 2009 is incorporated as a reference.

While the invention has been explained with reference to the specific embodiments of the invention, the explanation is illustrative and the invention is limited only by the appended claims.

What is claimed is:

1. A switching power supply comprising:
   a rectifier circuit conducting full-wave rectification of an AC power supply for obtaining a pulsating output;
   a chopper circuit comprising:
      an inductor having a first end connected to the rectifier circuit,
      a capacitor smoothing a current fed from the inductor for obtaining a DC output, and
      a switching device connected to a second end of the inductor, the switching device conducting an on-off control of the current fed to the capacitor;
   an input voltage detector circuit detecting an input voltage fed to the chopper circuit, the input voltage detector circuit outputting an input voltage detection signal;
   an output voltage error detector circuit detecting an error between an output voltage from the chopper circuit and a set voltage, the output voltage error detector circuit outputting an output voltage error signal;
a current control signal generator circuit generating a current control signal in-phase with the input voltage detection signal, the current control signal having a waveform similar to a waveform of the input voltage detection signal and an amplitude proportional to the output voltage error signal;
a current detector circuit detecting the current flowing through the inductor, the current detector circuit outputting a current detection signal;
a frequency setting circuit generating a switching frequency signal;
an oscillator circuit generating an oscillation signal at a frequency based on the switching frequency signal; and
a switching control circuit turning on and off the switching device based on the oscillation signal, the current control signal, and the current detection signal,
wherein the frequency setting circuit changes the frequency of the oscillator circuit in response to either one or both of changes of the input voltage detection signal and the current control signal, and
wherein the frequency setting circuit changes the frequency of the oscillator circuit such that the frequency becomes higher as the input voltage detection signal is larger in a first region in which an absolute value of an AC power supply voltage is small, the frequency setting circuit changes the frequency of the oscillator circuit such that the frequency becomes lower as the current control signal is larger in a second region in which the absolute value of the AC power supply voltage is large, and the frequency setting circuit sets the frequency of the oscillator circuit to be constant in a third region between the first and second regions.

2. The switching power supply according to claim 1, wherein the frequency setting circuit comprises a non-inverting amplifier circuit, an inverting amplifier circuit, and a buffer circuit connected to the non-inverting amplifier and the inverting amplifier, the buffer circuit outputting a frequency setting signal.

3. The switching power supply according to claim 2, wherein the buffer circuit receives an input voltage through the non-inverting amplifier circuit, a current control signal through the inverting amplifier circuit, and a constant voltage signal, and outputs a smallest signal among the input voltage, current control signal and the constant voltage signal.

4. The switching power supply according to claim 1, wherein the oscillator circuit comprises a current source, a comparator, a capacitor charged by a current from the constant current source, and a transistor connected to the capacitor and the comparator and controlling a charge and discharge of the capacitor.

* * * * *

UNITED STATES PATENT AND TRADEMARK OFFICE
CERTIFICATE OF CORRECTION

PATENT NO. : 8,289,738 B2
APPLICATION NO. : 12/659316
DATED : October 16, 2012
INVENTOR(S) : Hideo Shimizu It is certified that error appears in the above-identified patent and that said Letters Patent is hereby corrected as shown below:

Please change column 4, line 22, "capacitor 150," to --capacitor 15C,--.

Please change column 5, line 9, "the=higher side," to --the higher side,--.

Please change column 5, line 25, "capacitor 150" to --capacitor 15C--.

Signed and Sealed this
Second Day of April, 2013

Teresa Stanek Rea
*Acting Director of the United States Patent and Trademark Office*